United States Patent
Davis et al.

(10) Patent No.: US 6,281,279 B1
(45) Date of Patent: Aug. 28, 2001

(54) METHOD FOR PRODUCING MICRON SIZED SILICONE RUBBER PARTICLES

(75) Inventors: Stephen V. Davis, Proctorville, OH (US); Jerry A. Pickering, Hilton; Nataly Boulatnikov, Ontario, both of NY (US)

(73) Assignee: Nex Press Solutions LLC, Rochester, NY (US)

( * ) Notice: Subject to any disclaimer, the term of this patent is extended or adjusted under 35 U.S.C. 154(b) by 0 days.

(21) Appl. No.: 09/475,784

(22) Filed: Dec. 30, 1999

(51) Int. Cl.[7] .................................................. C08J 3/03
(52) U.S. Cl. .............................. 524/501; 528/32; 528/15; 525/478
(58) Field of Search ............................ 524/501; 528/32, 528/15; 525/478

(56) References Cited

U.S. PATENT DOCUMENTS

| 4,742,142 | 5/1988 | Shimizu et al. . |
| 4,743,670 | 5/1988 | Yoshida et al. . |
| 4,962,165 | * 10/1990 | Bortnick et al. . |

FOREIGN PATENT DOCUMENTS

| 25510 | 3/1981 | (EP) . |
| 60-81227 | 5/1985 | (JP) . |
| 62-257939 | 10/1987 | (JP) . |
| 952895 | 8/1982 | (SU) . |

OTHER PUBLICATIONS

Silicon Rubber in Powder Form, Swanson, Leicht and Wegener, American Chemical Society, Rubber Division, Oct. 1974.

* cited by examiner

Primary Examiner—Margaret G. Moore
Assistant Examiner—Kuo-Liang Peng
(74) Attorney, Agent, or Firm—Lawrence P. Kessler

(57) ABSTRACT

A method for preparing silicone particles having an average particle size of 6 microns or less, said method comprising the following steps. First, a multifinctional vinyl terminated polysiloxane is mixed with a hydride terminated polysiloxane, surfactant, and polymerization catalyst under ambient conditions. This mixture is then dispersed in water under ambient conditions. The dispersion is the heated to cure the silicone. Afterwards the dispersion is broken and the particles are washed.

3 Claims, No Drawings

METHOD FOR PRODUCING MICRON SIZED SILICONE RUBBER PARTICLES

FIELD OF THE INVENTION

The present invention relates to a method for producing micron sized silicone rubber powder. More particularly, this invention relates to a method for producing silicone rubber in the form of particles from a combination of vinyl terminated and hydride terminated liquid polysiloxanes.

BACKGROUND OF THE INVENTION

Methods are known in the art for producing silicone rubber powder. One such method involves pulverizing cured silicone rubber into a powder after it has been frozen with dry ice. See Japanese Kokai JP 60-81, 227; Soviet Union Patent No. 952895 and Silicone Rubber in Powder Form, by Swanson, Leicht and Wegener, American Chemical Society, Rubber Division, October 1974. Another method is pulverizing cured silicone rubber into a powder using a grinder at ambient temperature. Using these methods, it is difficult to obtain high productivity and uniform micron sized particles. It is also too costly for many applications.

There have also been direct methods developed for producing silicone rubber particles. European Patent Application Publication No. 025510, Method for Producing Silicone Rubber Powder, involves blending a curable liquid silicone rubber composition at temperatures from −60° C. to plus 5° C., maintaining the mixture at this temperature, and then spraying the mixture into hot air, at a temperature of from 80° C. to 200° C. This method uses a curable liquid silicone rubber composition containing a liquid, reactive-group-containing organopolysiloxane with at least two alkenyl groups per polymer, an organopolysiloxane crosslinker containing at least two hydride functionalities per polymer chain, and a catalyst. The technique is designed to produce spherical silicone rubber particles with diameters from several hundred microns to several hundred millimicrons.

Japanese Patent Application JP62-257939, discloses making silicone rubber particles having particle sizes below 20 microns. These particles are made by a process similar to that disclosed in U.S. Pat. No. 4,742,142 using spray drying to isolate the cured silicone rubber particles.

U.S. Pat. No. 4,743,670 is also directed to a method for producing silicone rubber powder. This method involves preparing a heat-curable, liquid silicone rubber dispersion in water at a temperature of from 0°C. to 25° C. in the absence of any surfactant.

U.S. Pat. No. 4,742,142 describes a method for making small silicone rubber powders of uniform shape without grinding or cryofracturing. This method uses a curable liquid silicone rubber composition containing a liquid, reactive-group-containing organopolysiloxane with at least two alkenyl groups per polymer, an organopolysiloxane crosslinker containing at least two hydride functionalities per polymer chain, and a catalyst. The ingredients are blended together at a temperature of from −60° C. to plus 5° C., preferably from −30° C. to 0° C., to prevent the mixture from curing prematurely. The mixture is then emulsified by blending with water and a surfactant at a temperature from 0° C. to 25° C. The emulsion is then dispersed into water and cured at a temperature of at least 25° C. Illustrative examples demonstrate the curing step, using water at 40° C. and 80° C., followed by isolating the particles to produce spherical crosslinked rubber particles of about 10 and 20 microns. This patent by itself and in conjunction with the earlier cited patents teaches that a lower temperature is preferred prior to dispersion.

Large scale commercial production of silicone rubber particles which requires maintaining a dispersion of a curable liquid organopolysiloxane at temperature below 25° C. to prevent premature curing, are a significant disadvantage. It would be more advantageous to be able to prepare cured silicone polymer particles without the need for such low temperature processing.

U.S. Pat. No 4,962,165 describes an ambient temperature process for producing micron sized particles by a somewhat tedious process beginning with small molecular weight materials (monomers) up to oligomers.

SUMMARY OF THE INVENTION

The present invention provides an improved method to prepare silicone-containing polymer particles of spherical shape with average particle size 6 microns or less. The process proceeds at ambient temperature and involves fewer steps than heretofore disclosed in the art. Particles of silicone rubber are fabricated by (a) mixing a multifunctional vinyl terminated polysiloxane with a hydride terminated polysiloxane, surfactant, and polymerization catalyst under ambient conditions;

(b) dispersing the mixture in water under ambient conditions;

(c) heating the dispersion to cure the silicone;

(d) breaking the dispersion; and (e) recovering the particles.

DETAILED DESCRIPTION OF THE INVENTION

This invention provides a method for preparing cured silicone particles having an average particle size 6 microns or less. The method consists of the following steps:

(a) mixing a multifunctional vinyl terminated polysiloxane with a multifunctional hydride terminated polysiloxane, surfactant, and polymerization catalyst under ambient conditions without the need for cooling the mixture. Each polymer chain has at least two endgroups and either the vinyl or hydride chains has at least three functional groups to crosslink the combination of vinyl terminated and hydride terminated liquid polysiloxanes;

(b) dispersing the mixture in water at ambient temperature;

(c) heating the dispersion to 60° C. to cure the silicone;

(d) breaking the dispersion with the addition of a salt such as sodium sulfate and washing the particles to remove the salt and the dispersing surfactant and recovering the particles. Depending on the desired application, the isolation of the particles can be carried to different extents up to and including drying the particles to produce a powder. By "ambient temperature" is meant 25–30° C.

The present method will now be explained in detail. The curable liquid silicone rubber composition used in the present invention is a liquid or a paste at ambient temperature and is based on a liquid, reactive group-containing multifunctional vinyl terminated polysiloxane (Component (A)) with a multifunctional hydride terminated polysiloxane (Component (B)) and a curing catalyst (Component C). Upon heating, the silicone rubber composition cures into a rubbery elastomer. With regard to the curing mechanism of the compositions, the present method can utilize addition-reaction types. Addition-reaction types are preferred due to their rapid curing rate and excellent uniformity in curing. At least one of Component (A) and component (B) must contain some molecules with greater than two functional groups per chain.

Component (A) is the principal component of the preferred liquid silicone rubber compositions, and it reacts with component (B) under the catalytic activity of component (C) to produce a cured silicone rubber. Component (A) must contain at least 2 vinyl functionalities in each molecule. In addition to vinyl functionality, component (A) can also be of allyl, propenyl, etc. functionality. The alkenyl groups can be present at any position in the molecule, but they are preferably present at least at the molecular terminals. Furthermore, the molecular configuration of component (A) can be straight chain, branch-containing straight chain. The molecular weight of this component is not specifically restricted.

Suitable vinyl-containing polysiloxanes include but are not limited to methylvinylpolysiloxanes, methylvinylsiloxane-dimethylsiloxane copolymers, dimethylvinylsiloxy-terminated dimethylpolysiloxanes, dimethylvinylsiloxyterminated dimethylsiloxane-methylphenylsiloxane copolymers, dimethylvinylsiloxy-terminated dimethylsiloxane-diphenylsiloxane-methylvinyl-siloxane copolymers, trimethylsiloxy-terminated dimethylsiloxane-methylvinyl-siloxane copolymers trimethylsiloxy-terminated dimethylsiloxane-methylphenylsiloxane-methylvinyl-siloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl) siloxane copolymers, and combinations thereof.

Component (B) of the present preferred composition is the crosslinker for component (A). Curing proceeds by the addition reaction of the silicon-bonded hydrogen atoms in this component with the alkenyl functionality in component (A) under the catalytic activity of component (C). Component (B) must contain at least 2 silicon-bonded hydrogen atoms in each molecule in order to function as a crosslinker.

The molecular configuration of component (B) is not specifically restricted, and it can be straight chain or branch-containing straight chain. The molecular weight of this component is not specifically restricted.

Examples of this component (B) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers.

Component (C) is a catalyst for the addition reaction of silicon-bonded hydrogen atoms with alkenyl radicals. Suitable catalysts include metals from the platinum group of the periodic table of the elements and compounds of these metals. Concrete examples of catalysts include but are not limited to chloroplatinic acid, chloroplatinic acid dissolved in an alcohol or ketone.

The concentration of component (C) in the preferred curable compositions is typically equivalent to from 0.001 to 0.1 weight percent of catalyst based on the total weight of components (A) and (B).

In accordance with the present method the ingredients of the liquid silicone rubber composition are combined and blended at ambient temperature.

In accordance with the present method a curable liquid silicone rubber composition produced using any of the methods described hereinabove is emulsified by blending it with water in the presence of a surfactant, the temperature being between 25° C. and 30° C.

The emulsion can be prepared by a number of methods. In accordance with one of these methods, the mixture containing surfactant, catalyst and uncured liquid silicone resin compositions are passed through a commercial homogenizer to provide adequate mixing. Distilled water is added and again passed through a commercial homogenizer to form the emulsion.

The surfactants useful for forming the emulsion are not specifically restricted and include any of the nonionic and anionic surfactants and emulsifying agents that have heretofore been employed for this purpose.

The emulsion is preferably prepared at temperatures between 25° C. and 30° C. Temperatures below 25° C. tend to yield smaller particles (after curing and isolation which agglomerate to form seemingly large particles ~10–20 $\mu$m in average particle size.

The emulsified liquid silicone rubber composition is then cured by heating the dispersion. Temperatures below 25° C. are undesirable because the curing rate of the liquid silicone rubber compositions used in the present invention then declines, resulting in a tendency for the shape of the silicone rubber powder to be irregular and the production rate to be reduced.

The following examples describe preferred embodiments of the present method and should not be interpreted as limiting the scope of the invention defined in the accompanying claims.

EXAMPLE 1

A mixture of SHC PS124 (3–4%) methylhydro (96–97%) dimethyl-siloxane polymer (20 g) and SVC PS 443 polydimethylsiloxane, vinyldimethyl terminated polymer (30 g) was mixed under ambient conditions using a Kady Mills homogenizer for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water an d a stable latex was prepared by homogenization for 10 to 15 minutes.

The latex was heated to 60° C. for 15 hours. The latex was then deemulsified with anhydrous sodium sulfate (20 g) and the silicone rubber particles were obtained by filtration under a vacuum, washing with distilled water, and drying under vacuum at 25° C. The resulting particle size distribution was 2–12 $\mu$m.

COMPARATIVE EXAMPLE 1

A mixture of SHC PS124 (3–4%) methylhydro (96–97%) dimethyl-siloxane polymer (20 g) and SVC PS 443 polydimethylsiloxane, vinyldimethyl terminated polymer (30 g) was mixed at −30° C. using a Kady Mills homogenizer for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was prepared by homogenization for 10 to 15 minutes.

The latex was heated to 60° C. for 15 hours. The latex was then deemulsified with anhydrous sodium sulfate (20 g) and the silicone rubber particles were obtained by filtration under a vacuum, washing with distilled water, and drying under vacuum at 25° C. The resulting particle size distribution was 2–12 $\mu$m.

COMPARATIVE EXAMPLE 2

A mixture of SHC PS124 (3–4%) methylhydro (96–97%) dimethylsiloxane polymer (20 g) and SVC PS 443 polydimethylsiloxane, vinyldimethyl terminated polymer (30 g) was mixed at 0° C. using a Kady Mills homogenizer for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was prepared by homogenization for 10 to 15 minutes.

The latex was heated to 60° C. for 15 hours. The latex was then deemulsified with anhydrous sodium sulfate (20 g) and the silicone rubber particles were obtained by filtration under a vacuum, washing with distilled water, and drying under vacuum at 25° C. The resulting particle size distribution was 2–12 µm.

Thus according to the present invention, a method for producing silicone rubber particles has been provided. In particular a method without the restriction of cooling the resin mixture prior to dispersing has been provided.

What is claimed is:

1. A method for preparing silicone particles having an average particle size of 6 microns or less, said method comprising:

(a) mixing a multifunctional vinyl terminated polysiloxane with a hydride terminated polysiloxane, surfactant, and polymerization catalyst under ambient conditions;

(b) dispersing the mixture in water under ambient conditions;

(c) heating the dispersion to a temperature sufficient to cure the silicone;

(d) breaking the dispersion; and (e) washing and recovering the particles.

2. A method according to claim 1 wherein the curing is carried out by a platinum catalyzed addition reaction between an organopolysiloxane containing at least two lower alkenyl radicals and an organohydrogenpolysiloxane containing at least two silicon bonded hydrogen atoms per molecule.

3. A method according to claim 1 wherein the curing is carried out using an organic peroxide in a free radical initiated polymerization of an organopolysiloxane containing at least two vinyl radicals per molecule.

* * * * *